(12) United States Patent
Dijk et al.

(10) Patent No.: US 6,669,863 B1
(45) Date of Patent: Dec. 30, 2003

(54) ANIONIC CELLULOSE ETHERS HAVING TEMPERATURE-DEPENDENT ASSOCIATIVE PROPERTIES

(75) Inventors: Berend Jan Dijk, Leusden (NL); Jan Gerardus Batelaan, Westervoort (NL)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/857,744
(22) PCT Filed: Dec. 7, 1999
(86) PCT No.: PCT/EP99/09662
§ 371 (c)(1), (2), (4) Date: Aug. 31, 2001
(87) PCT Pub. No.: WO00/35957
PCT Pub. Date: Jun. 22, 2000

Related U.S. Application Data
(60) Provisional application No. 60/112,300, filed on Dec. 14, 1998.

(30) Foreign Application Priority Data

Dec. 11, 1998 (EP) .............................. 98204186

(51) Int. Cl.[7] ................................................ C09K 5/00
(52) U.S. Cl. ........................... 252/73; 536/84; 536/90; 536/95; 536/96; 536/97; 536/98; 536/99; 536/101; 162/70; 162/72
(58) Field of Search ................... 252/73; 536/84, 536/90, 95, 96, 97, 98, 99, 101; 162/70, 72

(56) References Cited

FOREIGN PATENT DOCUMENTS

| DE | 39 27 567 A1 | 2/1991 | ............. C10L/1/32 |
|----|--------------|--------|------------------------|
| EP | 0 295 628 A2 | 12/1988 | ......... C08B/11/193 |
| EP | 0 470 444 A3 | 2/1992 | ......... C08B/11/193 |
| EP | 0 541 939 A1 | 5/1993 | ......... C08B/11/187 |
| EP | 0 566 911 A1 | 10/1993 | ............. C09D/7/00 |
| EP | 0 853 159 A1 | 7/1998 | .......... D21H/23/32 |
| WO | WO 97/31950 | 9/1997 | ......... C08B/11/193 |
| WO | WO 98/03709 | 1/1998 | ............. D03J/1/02 |
| WO | WO 98/56825 | 12/1998 | ......... C08B/11/193 |

OTHER PUBLICATIONS

Journal of Applied Polymer vol. 61 pp. 1831–1838 (1996) Characteristics of Carboxymethyl Cellulose Synthesized in Two–Phase Medium $C_6H_6$–$C_2H_5$ OH.I. Distribution of Substituent Groups in Anhydroglucose Unit.
Derwent Abstract No.: 93–127051/16 10/91.
Derwent Abstract No.: 92–050520/07 7/90.
Derwent Abstract No.: 91–066182/10 8/89.
Derwent Abstract No.: 97–294981/27 4/97.
Derwent Abstract No.: 94–022918/03 5/92.
International Search Report.

*Primary Examiner*—Yogendra N. Gupta
*Assistant Examiner*—D G Hamlin
(74) *Attorney, Agent, or Firm*—Lainie E. Parker; Ralph J. Mancini

(57) ABSTRACT

An anionic cellulose ether obtainable by a process comprising reacting an alkali metal cellulose with one or more reagents A selected from the group consisting of haloacetic acids, alkali metal haloacetates, alkali metal vinyl sulfonates, vinyl sulfonic acid, and precursors thereof, and one or more reagents B having the formula $R^1$—$(OCH_2CH(R^2))_n$-P, wherein $R^2$ represents hydrogen or a methyl group; n is 0–2; P represents a glycidyl ether group, a 1,2-epoxy group or a precursor thereof, if P represents a glycidyl ether group, $R^1$ represents a linear $C_3$–$C_5$ alkyl group, optionally containing an oxygen atom, a phenyl group, or a benzyl group, and if P represents a 1,2-epoxy group, $R^1$ represents a linear $C_3$–$C_5$ alkyl group, optionally containing an oxygen atom. Preferably, reagent A is chloroacetic acid and reagent B is n-butyl glycidyl ether. The invention also relates to the use of said anionic cellulose ether as an associative thickener, rheology modifier or stabilizer.

13 Claims, 3 Drawing Sheets

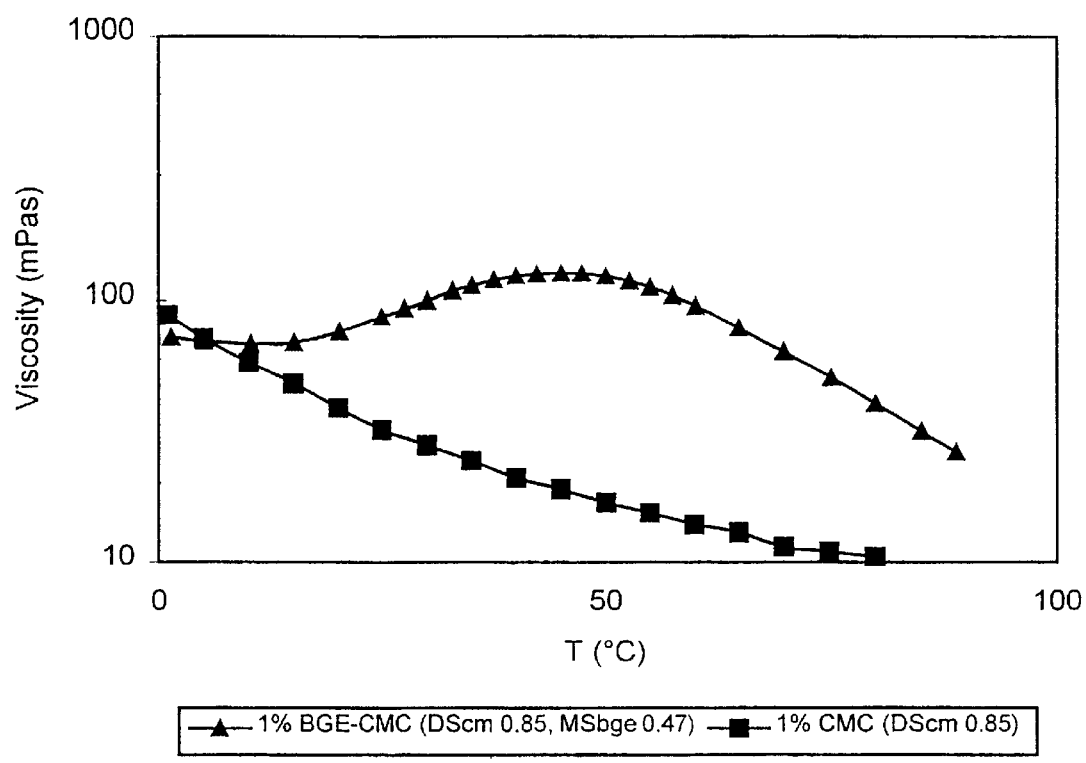
Figure 1. Viscosity-temperature curves of BGE-CMC and CMC measured with spindle sc4-18 at a shear rate of 15.8 s$^{-1}$ in demineralized water at pH 7

Figure 2. Viscosity-temperature curve of BGE-CMC measured with spindle sc4-34 at a shear rate of 0.17 s$^{-1}$ in demineralized water at pH 7
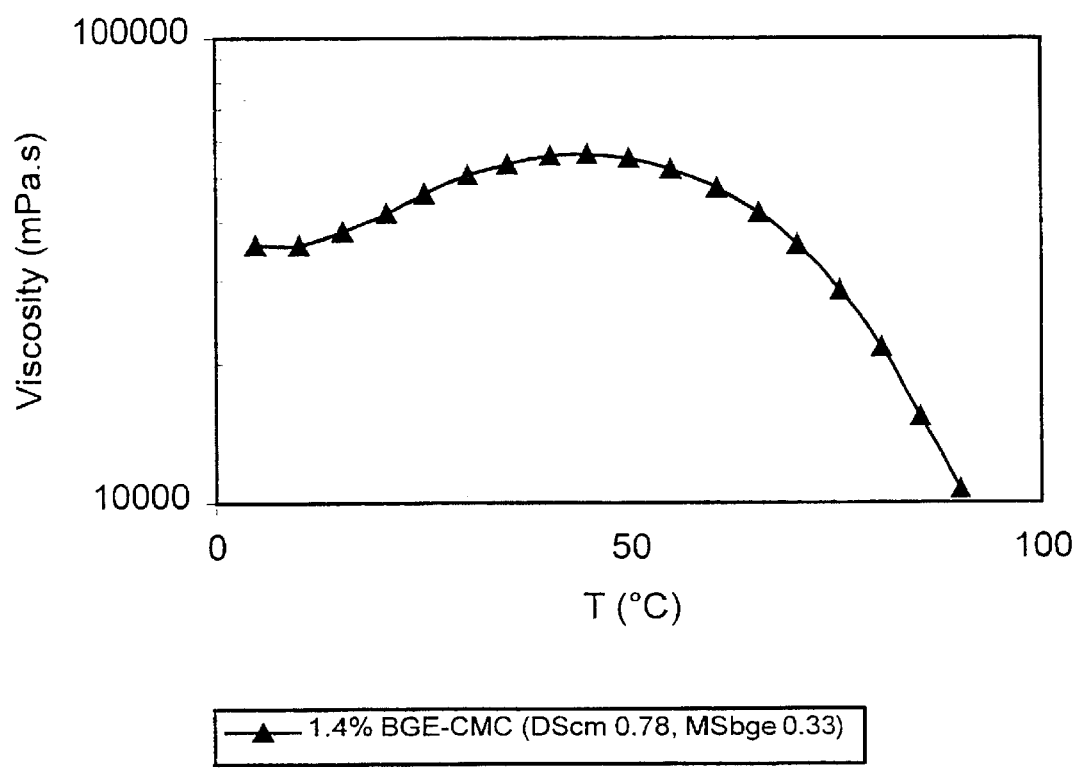

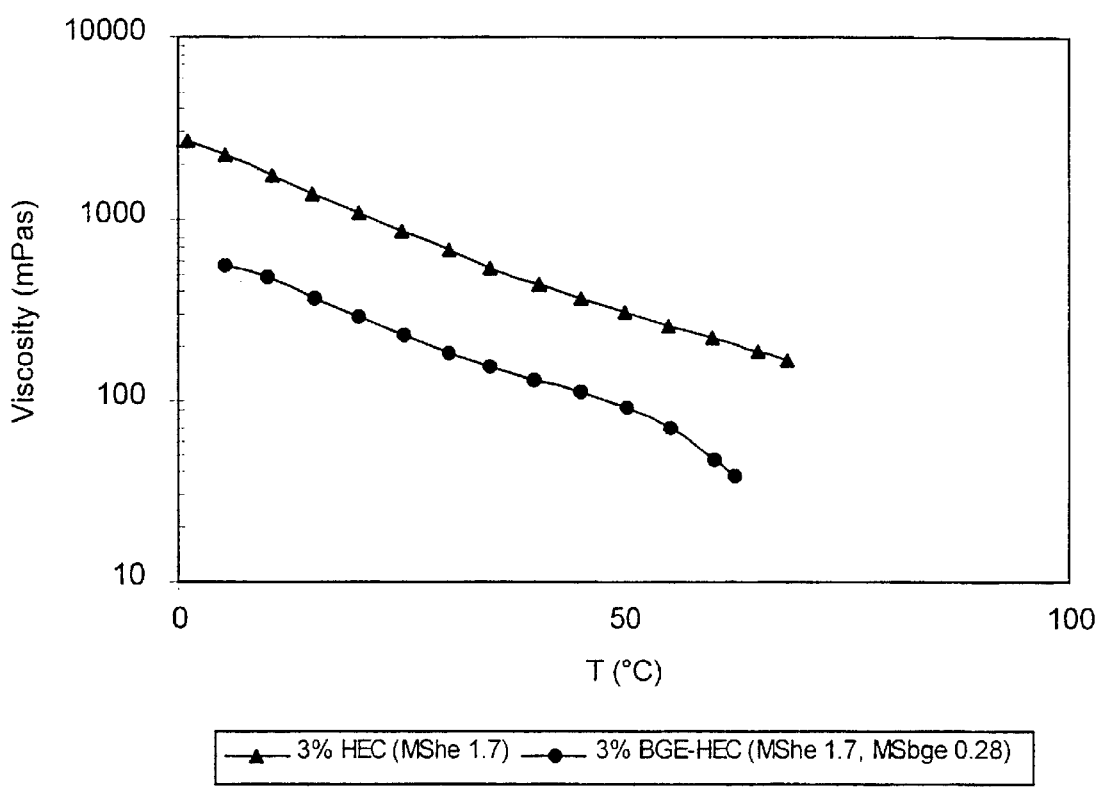
Figure 3. Viscosity-temperature curves of BGE-HEC and HEC measured with spindle sc4-18 at a shear rate of 3.96 $s^{-1}$ in demineralized water at pH 7

ANIONIC CELLULOSE ETHERS HAVING TEMPERATURE-DEPENDENT ASSOCIATIVE PROPERTIES

This application is the national phase of PCT/EP99/09662, filed Dec. 7, 1999, which claims the benefit of U.S. Provisional Application No. 60/112,300, filed Dec. 14, 1998 and of European Patent Application No. 98204186.5, filed Dec. 11, 1998.

FIELD OF THE INVENTION

The invention relates to anionic cellulose ethers and to the use of said ethers as associative thickeners, rheology modifiers or stabilizers.

BACKGROUND OF THE INVENTION

Associative thickeners, rheology modifiers, and stabilizers for emulsions and suspensions are used in many applications including water-based paints, (oil) drilling, paper making, (laundry) detergents, and personal care products or cosmetics. However, most compounds typically used in these applications suffer from the disadvantage that the viscosity of the composition decreases with increasing temperature. In other words, the performance of these compounds is poorer at higher temperatures, typically in the range of 20 to 60° C.

EP-A1-0 853 159 relates to a process and a coating colour for coating a cellulosic web. It is described that the coating colour contains an aqueous polymer whose viscosity in an aqueous solution increases when the temperature rises. Preferably, methyl cellulose is used. In FIG. 3 it is shown that carboxymethyl cellulose is not subject to an increase in viscosity with increasing temperature.

Although this document does not pertain to anionic cellulose ethers of the type disclosed below, it describes the effect which is also desired in the present application. A drawback to the use of the cellulose ethers disclosed in EP-A1-0 853 159 is that with increasing temperature the solubility of the polymer is lost completely. In fact, the transient increase in viscosity is caused by the loss of solubility of the polymer with increasing temperature. Hence, it is the aim of the present application to provide alternatives to these polymers which do not have this disadvantageous property.

Anionic cellulose ethers are known in the art. There are several documents showing that hydrophobically modified cellulose ethers have associative properties and cause thickening of compositions containing them.

EP-A1-0 566 911 pertains to hydrophobically modified polysaccharide ethers, having a molecular weight of 10,000 to 300,000, which are substituted with hydrophobic alkyl or alkaryl groups having 8 to 24 carbon atoms and which can be used as associative thickeners in aqueous protective coatings. Table 4 discloses carboxymethyl hydroxypropyl starch substituted with $C_{18}$ hydrophobic groups and carboxymethyl hydroxyethyl cellulose substituted with $C_{16}$ hydrophobic groups. These compounds were prepared, according to the footnote of Table 4, by reacting carboxymethyl hydroxypropyl starch and carboxymethyl hydroxyethyl cellulose with stearyl isocyanate using dimethyl sulfoxide as a solvent.

JP-A-09110901 relates to carboxymethyl polysaccharide ethers substituted with a $C_8$–$C_{40}$, optionally branched alkyl or alkenyl glycidyl ether and their use as a thickening agent for cosmetics and toiletries. In Examples 1–14, carboxymethyl hydroxyethyl cellulose, carboxymethyl methyl cellulose, and carboxymethyl hydroxypropyl starch substituted with stearyl, palmityl, behenyl or isostearyl glycidyl ether groups are disclosed. These compounds are prepared by reacting the polysaccharide, e.g. hydroxyethyl cellulose, with the glycidyl ether, followed by carboxymethylation.

Similar types of compounds, e.g. carboxymethyl hydroxypropyl methyl cellulose substituted with stearyl glycidyl ether groups, and preparative processes are described in JP-A-05331201. Said compounds are reported to be used as thickening agents in cataplasm and cosmetic compositions.

WO 97/31950 pertains to carboxymethyl cellulose ethers substituted with long-chain groups and their use as thickening additives for aqueous compositions such as paints, plasters, and cosmetics. On page 7 of this document said cellulose ethers are reported to possess high associative properties. In Example 1, carboxymethyl cellulose is reacted with 1-epoxyoctadecane and in Example 19; carboxymethyl cellulose is reacted with dodecyl glycidyl ether.

DE-A1-3927567 pertains to the use of hydrophobically modified cellulose ethers for stabilizing aqueous coal slurries. These cellulose ethers are substituted with hydrophobic groups having at least six carbon atoms in the form of, inter alia, 3-alkoxy-2-hydroxypropyl and 2-alkyl-2-hydroxyalkyl groups. In column 4, lines 15–16, n-butyl glycidyl hydroxyethyl cellulose is exemplified.

EP-A2-0 295 628 relates to water-soluble 3-alkoxy-2-hydroxypropyl derivatives of hydroxyethyl, hydroxypropyl, and methyl cellulose ethers and their use in building compositions. The alkyl group is a straight- or branched-chain alkyl group having 2 to 8 carbon atoms. As is shown in Example 1, these compounds are prepared in a slurry process by reaction of hydroxyethyl cellulose with n-butyl glycidyl ether.

However, none of these prior art documents describes the desired viscosity-temperature relationship explained above. It is further expected that the cellulose ethers which are disclosed in these documents will have decreasing viscosity with increasing temperature.

EP-A1-0 541 939 discloses a number of 3-allyloxy-2-hydroxypropyl ethers of celluloses substituted with other ether groups including methyl 3-allyloxy-2-hydroxypropyl cellulose, hydroxyethyl 3-allyloxy-2-hydroxypropyl cellulose, and carboxymethyl 3-allyloxy-2-hydroxy-propyl cellulose. These water-soluble cellulose ethers are polymerizable, which may be advantageous in some applications. However, cellulose ethers containing allyl groups are unstable compounds and will decompose gradually upon storage. This, obviously, is a disadvantage and for this reason such compounds are not desired for use in applications in accordance with the present invention.

Surprisingly, we have found anionic cellulose ethers which show a lesser decrease, or even an increase, in viscosity with an increase in temperature, and this effect is believed to be due to a reversible temperature-dependent association. Furthermore, unlike some of the (associative) thickeners of the prior art, the compounds of the invention retain their good water solubility even at higher temperatures. These properties make them particularly suitable for use in the applications mentioned above, in particular in drilling operations in which they are expected to reduce fluid loss.

SUMMARY OF THE INVENTION

The anionic cellulose ether according to the present invention is obtainable by a process comprising reacting an alkali metal cellulose with one or more reagents A selected from the group consisting of haloacetic acids, alkali metal haloacetates, alkali metal vinyl sulfonates, vinyl sulfonic acid, and precursors thereof, and one or more reagents B having the formula $R^1$—$(OCH_2CH(R^2))_n$-P, wherein $R2$ represents hydrogen or a methyl group, n is 0–2, P represents a glycidyl ether group, a 1,2-epoxy group or a precursor thereof, if P represents a glycidyl ether group, $R^1$ represents a linear $C_3$–$C_5$ alkyl group, optionally containing an oxygen atom, a phenyl group or a benzyl group, if P represents a 1,2-epoxy group, $R^1$ represents a linear $C_3$–$C_5$ alkyl, optionally containing an oxygen atom, with the proviso that in the process no use is made of a reagent having the formula $R^3$—$(OCH_2CH(R^4))_m$-Q, wherein $R^3$ represents a $C_8$–$C_{30}$ group, $R^4$ represents hydrogen or a methyl group, m is 0–10, and Q represents a glycidyl ether group, a 3-halo-2-hydroxypropyl ether group, a 1,2-epoxy group or a halide.

BRIEF DESCRIPTION OF THE DRAWINGS

FIG. 1 shows viscosity-temperature curves of BGE-CMC and CMC measured with spindle sc4-18 at a shear rate of 15.8 $s^{-1}$ in demineralized water at pH 7;

FIG. 2 shows a viscosity-temperature curve of BGE-CMC measured with spindle sc4-34 at a shear rate of 0.17 $s^{-1}$ in demineralized water at pH 7; and FIG. 3 shows viscosity-temperature curves of BGE-HEC and HEC measured with spindle sc4-18 at a shear rate of 3.96 $s^{-1}$ in demineralized water at pH 7.

DETAILED DESCRIPTION OF THE INVENTION

The inventive anionic cellulose ethers show a lesser decrease, or even an increase, in viscosity with an increase in temperature.

Applicant's non-prepublished patent application PCT/EP98/03709 relates to hydrophobically modified anionic cellulose ethers which are obtainable by a process comprising reacting an alkali metal cellulose with at least three different alkylating reagents.

In the context of the present invention, by the terms precursor of an alkali metal vinyl sulfonate, of vinyl sulfonic acid, of a glycidyl ether group, and of a 1,2-epoxy group are meant an alkali metal 2-haloethane-1-sulfonate, a 2-haloethane-1-sulfonic acid, a 3-halo-2-hydroxypropyl ether group, and a 2-halo-hydroxyethyl group, respectively.

The anionic cellulose ethers of the present invention typically have a degree of polymerization (i.e. DP) in the range of 40 to 4,000, preferably 100 to 3,000, a degree of substitution (i.e. DS) of the substituent that is derived from reagent A in the range of 0.3 to 1.6, preferably 0.5 to 1.4, more preferably 0.6 to 1.4, and a molar substitution (i.e. MS) of the substituent that is derived from reagent B in the range of 0.05 to 1.5, preferably 0.1 to 0.8, more preferably 0.1 to 0.5.

Suitable and readily available cellulose starting materials include cotton linters and purified high-alpha wood pulp.

Typically, the cellulose is reacted with an aqueous solution of an alkali metal hydroxide to prepare an alkali metal cellulose, i.e. so-called alkalinization. Suitable alkali metal hydroxides include sodium hydroxide, potassium hydroxide, and lithium hydroxide, with sodium hydroxide being preferred.

Suitable reagents A for preparing the anionic cellulose ether of the present invention according to the process described above include chloroacetic acid, sodium chloroacetate, and sodium vinyl sulfonate. A mixture of, for example, chloroacetic acid and sodium vinyl sulfonate may also be used, and this results in the preparation of a hydrophobically modified carboxymethyl sulfoethyl cellulose. It is preferred that reagent A is, or consists essentially of, chloroacetic acid.

Preferably, $R^1$ represents a linear $C_3$–$C_5$ alkyl group, optionally containing an oxygen atom, more preferably a linear $C_3$–$C_5$ alkyl group, most preferably an n-butyl group. Preferably, R2 represents hydrogen. Preferably, n is 0 or 1, more preferably 0. Preferably, P is a glycidyl ether group.

Suitable reagents B include n-propyl glycidyl ether, n-butyl glycidyl ether, n-butoxyethyl glycidyl ether, phenyl glycidyl ether, benzyl glycidyl ether, methoxyethyl glycidyl ether, ethoxyethyl glycidyl ether, and mixtures thereof. A particularly preferred alkylating reagent B is n-butyl glycidyl ether.

The process in accordance with the present invention may be conducted at any desired reaction temperature. Typically, it is carried out between 20 and 125° C., preferably from about 55 to 105° C., for a sufficient time to provide the desired levels of substitution, typically from about 1 to 24 hours or more. The reaction may be conducted in a relatively large amount of diluent or with a minimal amount of diluent as desired, i.e., using either a so-called slurry or a so-called dry process.

In this specification, the term slurry process stands for a process where the weight ratio of liquid medium to cellulose is greater than 10, while a dry process means a process where the weight ratio of liquid medium to cellulose is equal to or smaller than 10, preferably smaller than 5, more preferably smaller than 3. Typically, a dry process is carried out in a high-efficiency intensive mixer, e.g. a plowshare mixer.

Suitable diluents include ethanol, isopropyl alcohol, tert-butyl alcohol, acetone, water, methylethyl ketone, and mixtures thereof. Preferred diluents are ethanol, isopropyl alcohol, water, and mixtures thereof. The use of water is particularly preferred.

It is preferred to carry out the process in accordance with the invention by means of the so-called dry process using a minimal amount of diluent, in particular water, that is, just enough to allow the cellulose to swell while preventing dissolution.

The reaction is carried out using means and equipment well-known to a person skilled in the art. The reaction vessel or reactor is suitably equipped with a stirrer or mixing gear, a nitrogen inlet tube, a condenser, and facilities for heating. A particularly suitable reactor is a Drais® or a Lödige® reactor.

The amount of alkali metal hydroxide per sugar repeating unit may vary depending on the alkylating agents used, as is known to a person skilled in this art. Typically, an amount of between from 0.001 to 5 moles per mole of sugar repeating unit is used. Depending on the nature of the alkylating reagent(s) used, additional alkali metal hydroxide is added. For instance, when using chlorinated alkylating agents, e.g., chloroacetic acid, an additional molar equivalent of hydroxide is required.

Many polysaccharides when in contact with base are readily degraded by oxygen. Accordingly, it is preferred to exclude oxygen from the reaction vessel during the time the alkali metal hydroxide is present. The reaction is suitably carried out in an atmosphere of an inert gas, preferably nitrogen.

After the reaction of the cellulose with a suitable amount of an aqueous solution of an alkali metal hydroxide, the alkali metal cellulose may be reacted (i.e. alkylated) first with alkylating reagent A, followed by a reaction with alkylating reagent B, at a suitable temperature and for a time sufficient to provide the desired levels of substitution. Alternatively, alkylating reagent B may be added first, after which alkylating reagent A is allowed to react, or the alkali metal cellulose may be simultaneously reacted with alkylating reagents A and B. A further alternative reaction path is to first add a small amount of reagent A, then reagent B, and finally the remainder of reagent A.

The process in accordance with the present invention may also be carried out by starting from a suitable commercially available cellulose derivative intermediate such as carboxymethyl cellulose (CMC) or its sodium salt. In that case, preferably a technical grade CMC is used. It was found that when a higher grade, purified CMC, which does not contain sodium chloride, was used, the yield was reduced. When using a purified CMC, yields could be restored by the addition of sodium chloride to the reaction mixture.

Preferably, the cellulose, in the form of fibres, linters or a powder, is allowed to react with an aqueous solution of an alkali metal hydroxide and the obtained alkali metal cellulose is reacted simultaneously with reagents A and B, with the temperature gradually being increased from about room temperature to about 105° C. The reagents A and B can be added in the pure form or as a solution in a diluent, e.g., a solution of chloroacetic acid in ethanol.

A more preferred embodiment of the process in accordance with the present invention is a preferably dry process in which reagent A is reacted with the alkali metal cellulose in the presence of an alcohol, in particular isopropanol or ethanol, followed by reaction with reagent B in the presence of water. Typically, the amount of water present during alkylation is 2 to 12 moles per mole of sugar repeating unit. Preferably, an amount of 3.5 to 10 moles/mole is used.

A person skilled in the art will have no trouble selecting suitable amounts of reactants per sugar repeating unit for the process defined above. For reagent A an amount of 0.3 to 3.5 moles per mole of sugar repeating unit is suitable, an amount of 0.5 to 2.5 moles/mole being preferred. For reagent B an amount of 0.02 to 2.5 moles/mole is suitable, an amount of 0.05 to 1.5 moles/mole being preferred. With these amounts, yields in the range of 20 to 60% can be obtained. If desired, however, higher amounts may also be used.

In another embodiment of the process in accordance with the present invention, a third alkylating reagent, i.e. a quaternary ammonium alkylating reagent C or a nonionic alkylating reagent D, is used. Typically, this substituent is introduced after the reaction of alkali metal cellulose with reagents A and B, but it may also be introduced earlier. Typically, reagent C is a 3-trialkylammonium-1,2-epoxypropane halide wherein each alkyl group independently is a $C_1$–$C_{24}$ alkyl group. Suitable alkyl groups include methyl, ethyl, propyl, benzyl, and $C_8$–$C_{24}$ fatty alkyl groups. Preferably, 3-trimethylammonium-1,2-epoxypropane chloride or 1-chloro-2-hydroxy-3-trimethylammonium-propane chloride is used. Suitable reagents D include ethylene oxide, propylene oxide, methyl chloride, ethyl chloride, 3-chloro-1,2-propanediol, glycidol, and mixtures thereof.

Without wishing to be bound by any particular theory, Applicant believes that the reaction of alkali metal cellulose with the glycidyl ethers and epoxides—in particular glycidyl ethers—in accordance with the present invention results in the formation of cascadic structures of the glycidyl ether and/or epoxide groups due to the fact that, for example, the secondary hydroxy group which is formed after the reaction of alkali metal cellulose with n-butyl glycidyl ether is more reactive than any of the hydroxy groups of the cellulose itself, and so on. Hence, this leads to structures in which —$[OCH_2CH(CH_2O\text{-n-Bu})]_n OH$ groups are attached to one or more cellulose glucose units, wherein n typically is in the range of 2–3. Said groups may also be carboxymethylated. It will be clear that the final structure of the anionic cellulose ether of the present invention is dependent on the order of addition of reagents A and B and on the reaction conditions used when performing the alkylation reactions, such as the amount of alkali metal hydroxide and the type and amount of diluent.

With the changes in structure of the anionic cellulose ether, the viscosity-temperature profile may also be influenced.

The invention is illustrated by the following examples.

EXAMPLES

Materials:

Linters Cellulose (0.5 mm milled), ex Buckeye n-Butyl glycidyl ether, 95%, ex CFZ Chloroacetic acid, 99%, ex Akzo Nobel The reactions were carried out in a Drais® Turbulent Mixer, type TR2.5, reactor. The knife blades were rotated at 180 rpm. The reactor was heated by a Thermomix UB water/oil bath.

The DS values were determined using a 300 MHz Bruker NMR spectrometer, as specified by F. Cheng et al. in *Journal of Applied Polymer Science*, Vol. 61, 1831–1838 (1996). MS values were determined accordingly. CM stands for carboxymethyl, BGE for n-butyl glycidyl ether, and HE for hydroxyethyl. The viscosity was recorded using a Brookfield DVIII rheometer equipped with a small sample adaptor using an appropriate spindle.

Example 1

An aqueous solution of 40 wt % sodium hydroxide (202 g) was added to a stirred mixture of cellulose (150 g) and 40 ml of water under a nitrogen atmosphere at 20° C. After 90 minutes an aqueous solution of 80 wt % chloroacetic acid (95.6 g) and n-butyl glycidyl ether (120 g) was added. Then the mixture was heated slowly to 95° C. and stirred for 8 hours. The reaction mixture was cooled, neutralized with acetic acid, washed with ethanol and acetone, and was dried under reduced pressure at 70° C. A white powder, i.e. n-butyl glycidyl carboxymethyl cellulose (BGE-CMC), was obtained in a yield of 47% with the following analysis (NMR): $DS_{CM}$ 0.74, $MS_{BGE}$ 0.47.

When BGE-CMC was dissolved in water, an almost clear, shear-thinning solution was obtained.

Example 2

An aqueous solution of 40 wt % sodium hydroxide (202 g) was added to a stirred mixture of cellulose (150 g), 40 ml of water, and n-butyl glycidyl ether (120 g) under a nitrogen atmosphere at 20° C. After 1 hour the mixture was heated at 80° C. for 23 hours. The mixture was cooled, and 450 ml of ethanol were added. Then a solution of chloroacetic acid (77.5 g) in 23 ml of ethanol was added, and the mixture was heated at 60° C. for 90 minutes and at 75° C. for 30 minutes. The mixture was cooled and neutralized with acetic acid.

The crude reaction product was washed with ethanol and acetone, and was dried under reduced pressure at 70° C. A white powder (BGE-CMC) was obtained with the following analysis (NMR): $DS_{CM}$ 0.70, $MS_{BGE}$ 0.32.

Example 3

An aqueous solution of 40 wt % sodium hydroxide (50 g) was added to a stirred mixture of carboxymethyl cellulose (215 g) with a $DS_{CM}$ of 0.85, n-butyl glycidyl ether (120 g), and an aqueous solution of 20 wt % sodium chloride (170 g). Then the reaction mixture was heated slowly to 95° C. and stirred for 6 hours, after which it was cooled, neutralized with acetic acid, washed with ethanol and acetone, and dried under reduced pressure at 70° C. An off-white product (BGE-CMC) was obtained with the following analysis (NMR): $DS_{CM}$ 0.85, $MS_{BGE}$ 0.47.

The viscosity-temperature profile of this compound is shown in FIG. 1 (see below).

Example 4

The change in viscosity of an aqueous solution of an anionic cellulose ether in accordance with the present invention with increasing temperature was recorded. The results are shown in FIGS. 1 and 2.

FIG. 1 shows the viscosity-temperature curves of BGE-CMC (the product of Example 3) and CMC at a relatively high shear rate.

FIG. 2 shows the viscosity-temperature curve of a different sample of BGE-CMC at a relatively low shear rate.

From these Figures it can be concluded that an anionic cellulose ether according to the present invention (BGE-CMC) shows an increase in viscosity with increasing temperature, whereas an anionic cellulose ether of the prior art (CMC) shows a marked decrease.

This viscosity-temperature effect was not observed for a sample of BGE-CMC containing n-butoxyethanol, which is known to prevent or destroy association.

Comparative Example A

An aqueous solution of 40 wt % sodium hydroxide (100 g) was added to a stirred mixture of hydroxyethyl cellulose (350 g), 40 ml of water, t-butanol (50 g), and n-butyl glycidyl ether (90 g) under a nitrogen atmosphere. After 45 minutes the mixture was heated to 95° C. and was stirred at this temperature for 4 hours. The mixture was cooled and neutralized with acetic acid. For analysis, a small sample was taken up in water, precipitated in acetone, filtered, washed with acetone, and dried. A brown powder, i.e. n-butyl glycidyl hydroxyethyl cellulose (BGE-HEC), was obtained with the following analysis (NMR): $MS_{SH}$ 1.7, $MS_{BGE}$ 0.28.

Comparative Example B

The viscosities of aqueous solutions of HEC and BGE-HEC with increasing temperature were recorded. The results are shown in FIG. 3. A 3 wt % aqueous solution of these cellulose ethers had to be prepared in order to obtain a measurable viscosity.

From this Figure it can be concluded that these nonionic cellulose ethers of the prior art show a marked decrease in viscosity with increasing temperature and that this effect is more pronounced in the case of BGE-HEC.

What is claimed is:

1. An anionic cellulose ether obtainable by a process comprising reacting an alkali metal cellulose with
   one or more reagents A selected from the group consisting of haloacetic acids, alkali metal haloacetates, alkali metal vinyl sulfonates, vinyl sulfonic acid, and precursors thereof, and
   one or more reagents B having the formula $R^1$—$(OCH_2CH(R^2))_n$-P,
   wherein
   $R^2$ represents hydrogen or a methyl group,
   n is 0–2,
   P represents a glycidyl ether group, a 1,2-epoxy group or a precursor thereof,
   if P represents a glycidyl ether group, $R^1$ represents a linear $C_3$–$C_5$ alkyl group, optionally containing an oxygen atom, a phenyl group or a benzyl group,
   if P represents a 1,2-epoxy group, $R^1$ represents a linear $C_3$–$C_5$ alkyl group, optionally containing an oxygen atom,
   with the proviso that in the process no use is made of a reagent having the formula $R^3$—$(OCH_2CH(R^4))_m$-Q, wherein $R^3$ represents a $C_8$–$C_{30}$ group, $R^4$ represents hydrogen or a methyl group, m is 0–10, and Q represents a glycidyl ether group, a 3-halo-2-hydroxypropyl ether group, a 1,2-epoxy group or a halide.

2. The ether according to claim 1, wherein reagent A is chloroacetic acid.

3. The ether according to claim 1, wherein $R^1$ represents a linear $C_3$–$C_5$ alkyl group, optionally containing an oxygen atom.

4. The ether according to claim 1, wherein R2 represents hydrogen.

5. The ether according to claim 1, wherein n is 0.

6. The ether according to claim 1, wherein P represents a glycidyl ether group.

7. The ether according to claim 1, wherein reagent B is n-butyl glycidyl ether.

8. The ether according to claim 1, wherein the process is a dry process.

9. The ether according to claim 1, wherein the alkali metal cellulose is reacted with reagent A in the presence of an alcohol, followed by reaction with reagent B in the presence of water.

10. An associative thickener comprising the ether of claim 1.

11. A rheology modifier comprising the ether of claim 1.

12. A stabilizer comprising the ether of claim 1.

13. A method of reducing fluid loss while drilling which comprises utilizing the ether of claim 1.

* * * * *